US011373124B2

(12) United States Patent
Chandrasekharan et al.

(10) Patent No.: US 11,373,124 B2
(45) Date of Patent: Jun. 28, 2022

(54) SYSTEM AND METHOD FOR A CONTROL BASED PROJECT SCHEDULING MODE

(71) Applicant: ServiceNow Inc., Santa Clara, CA (US)

(72) Inventors: Bhuvaneshwari Chandrasekharan, Hyderabad (IN); Nitin Lahanu Hase, Hyderabad (IN); Pradeep Bansal, Santa Clara, CA (US); Balaji Cuttackam, Hyderabad (IN); Tarun Murala, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 532 days.

(21) Appl. No.: 15/971,690

(22) Filed: May 4, 2018

(65) Prior Publication Data
US 2019/0340565 A1    Nov. 7, 2019

(51) Int. Cl.
*G06Q 10/06* (2012.01)
*H04L 67/025* (2022.01)

(52) U.S. Cl.
CPC ......... *G06Q 10/063118* (2013.01); *G06Q 10/06316* (2013.01); *H04L 67/025* (2013.01)

(58) Field of Classification Search
None
See application file for complete search history.

(56) References Cited

U.S. PATENT DOCUMENTS

| | | |
|---|---|---|
| 6,321,229 B1 | 11/2001 | Goldman |
| 6,609,122 B1 | 8/2003 | Ensor |
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |

(Continued)

FOREIGN PATENT DOCUMENTS

WO    WO-2020016451 A1 *    1/2020    ............. G06N 7/005

OTHER PUBLICATIONS

Brcic, Mario and Mlinaric, Danijel, Tracking Predictive Gantt Chart for Proactive Rescheduling in Stochastic Resource Constrained Project Scheduling, Jun. 18, 2018, JIOS, vol. 42 No. 2, pp. 179-192 (Year: 2018).*

*Primary Examiner* — Amanda Gurski
(74) *Attorney, Agent, or Firm* — Fletcher Yoder P.C.

(57) ABSTRACT

Systems and methods may include a cloud computing system configured to execute instructions to generate a planning console accessible from an instance provided on a client network, wherein the planning console includes a semi-automated scheduling mode and a project with a plurality of project tasks that include a predecessor task with a planned timing, and wherein executing the instructions includes determining at least one dependency relationship between the predecessor task and at least one successor task, identifying a timing difference between the planned timing and an actual timing of the predecessor task, and generating an one or more user-selectable interaction points, in the semi-automated scheduling mode, to automatically update the project such that the at least one successor task is modified based on the actual timing of the at least one predecessor task and interaction with a second interaction point causes the project to remain the same.

18 Claims, 15 Drawing Sheets

(56) References Cited

U.S. PATENT DOCUMENTS

| | | | |
|---|---|---|---|
| 7,028,301 B2 | 4/2006 | Ding | |
| 7,062,683 B2 | 6/2006 | Warpenburg | |
| 7,113,915 B1* | 9/2006 | Montemayor | G06Q 10/06 705/7.13 |
| 7,131,037 B1 | 10/2006 | LeFaive | |
| 7,170,864 B2 | 1/2007 | Matharu | |
| 7,350,209 B2 | 3/2008 | Shum | |
| 7,392,300 B2 | 6/2008 | Anantharangachar | |
| 7,610,512 B2 | 10/2009 | Gerber | |
| 7,617,073 B2 | 11/2009 | Trinon | |
| 7,685,167 B2 | 3/2010 | Mueller | |
| 7,689,628 B2 | 3/2010 | Garg | |
| 7,716,353 B2 | 5/2010 | Golovinsky | |
| 7,769,718 B2 | 8/2010 | Murley | |
| 7,783,744 B2 | 8/2010 | Garg | |
| 7,890,802 B2 | 2/2011 | Gerber | |
| 7,925,981 B2 | 4/2011 | Pourheidari | |
| 7,930,396 B2 | 4/2011 | Trinon | |
| 7,933,927 B2 | 4/2011 | Dee | |
| 7,945,860 B2 | 5/2011 | Vambenepe | |
| 7,966,398 B2 | 6/2011 | Wiles | |
| 8,051,164 B2 | 11/2011 | Peuter | |
| 8,082,222 B2 | 12/2011 | Rangarajan | |
| 8,151,261 B2 | 4/2012 | Sirota | |
| 8,224,683 B2 | 7/2012 | Manos | |
| 8,266,096 B2 | 9/2012 | Navarrete | |
| 8,380,645 B2 | 2/2013 | Kowalski | |
| 8,457,928 B2 | 6/2013 | Dang | |
| 8,478,569 B2 | 7/2013 | Scarpelli | |
| 8,554,750 B2 | 10/2013 | Rangaranjan | |
| 8,646,093 B2 | 2/2014 | Myers | |
| 8,674,992 B2 | 3/2014 | Poston | |
| 8,689,241 B2 | 4/2014 | Naik | |
| 8,743,121 B2 | 6/2014 | De Peuter | |
| 8,745,040 B2 | 6/2014 | Kowalski | |
| 8,812,539 B2 | 8/2014 | Milousheff | |
| 8,828,994 B2 | 8/2014 | Kowalski | |
| 8,832,652 B2 | 9/2014 | Mueller | |
| 8,887,133 B2 | 11/2014 | Behnia | |
| 9,015,188 B2 | 4/2015 | Behne | |
| 9,037,536 B2 | 5/2015 | Vos | |
| 9,065,783 B2 | 6/2015 | Ding | |
| 9,098,322 B2 | 8/2015 | Apte | |
| 9,122,552 B2 | 9/2015 | Whitney | |
| 9,239,857 B2 | 1/2016 | Trinon | |
| 9,363,252 B2 | 6/2016 | Mueller | |
| 9,535,737 B2 | 1/2017 | Joy | |
| 9,557,969 B2 | 1/2017 | Sharma | |
| 9,645,833 B2 | 5/2017 | Mueller | |
| 9,654,473 B2 | 5/2017 | Miller | |
| 9,766,935 B2 | 9/2017 | Kelkar | |
| 9,792,387 B2 | 10/2017 | George | |
| 9,805,322 B2 | 10/2017 | Kelkar | |
| 9,852,165 B2 | 12/2017 | Morozov | |
| 10,002,203 B2 | 6/2018 | George | |
| 2005/0216111 A1* | 9/2005 | Ooshima | G06Q 10/06 700/99 |
| 2006/0004618 A1* | 1/2006 | Brixius | G06Q 10/1093 705/7.18 |

* cited by examiner

SYSTEM AND METHOD FOR A CONTROL BASED PROJECT SCHEDULING MODE

BACKGROUND

The present disclosure relates generally to project planning and management tools in a cloud computing infrastructure.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

Developing and managing projects using cloud computing can be a complex task. To manage this complexity, different project scheduling modes may be employed. For example, one project scheduling mode allows for project tasks to be automatically updated when another related project task is delayed. However, automatically updating project tasks may reduce a user's control of a project. Further, automatically updating project tasks may lead to confusion for entities managing or executing the project. For example, in a complex project, delays may frequently occur, and each delay may automatically update project tasks. As a result, timelines for the project tasks may change on a weekly or even daily basis, which may create confusion for entities executing the tasks.

As such, improvements in project scheduling modes or a new project scheduling mode is needed to improve project planning and management tools in a cloud computing infrastructure.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Systems and methods described below may include a planning console generated in a cloud computing environment that allows for planning and management of projects. The planning console includes a semi-automated mode of operation to manage project task parameters according to dependency relationships between the project tasks.

Further, as discussed herein, in some embodiments projects may include automatically updating project tasks under certain conditions. As an example, a planning console may be generated by the cloud computing system. The planning console may include a semi-automated scheduling mode and a project with a plurality of project tasks. In one example, the project tasks include a predecessor task having a planned timing. The system determines at least one dependency relationship between the predecessor task and at least one successor task. Moreover, the system identifies a timing difference between the planned timing and an actual timing of the predecessor task. Further, the system generates one or more user-selectable interaction points, in the semi-automated scheduling mode, wherein interaction with a first interaction point causes the project to be automatically updated such that the timing of at least one successor task is based on the actual timing based at least on the dependency relationship and interaction with a second interaction point causes the project timelines to remain the same, i.e., to not be updated.

BRIEF DESCRIPTION OF THE DRAWINGS

Various aspects of this disclosure may be better understood upon reading the following detailed description and upon reference to the drawings in which.

DESCRIPTION

Figure 1:
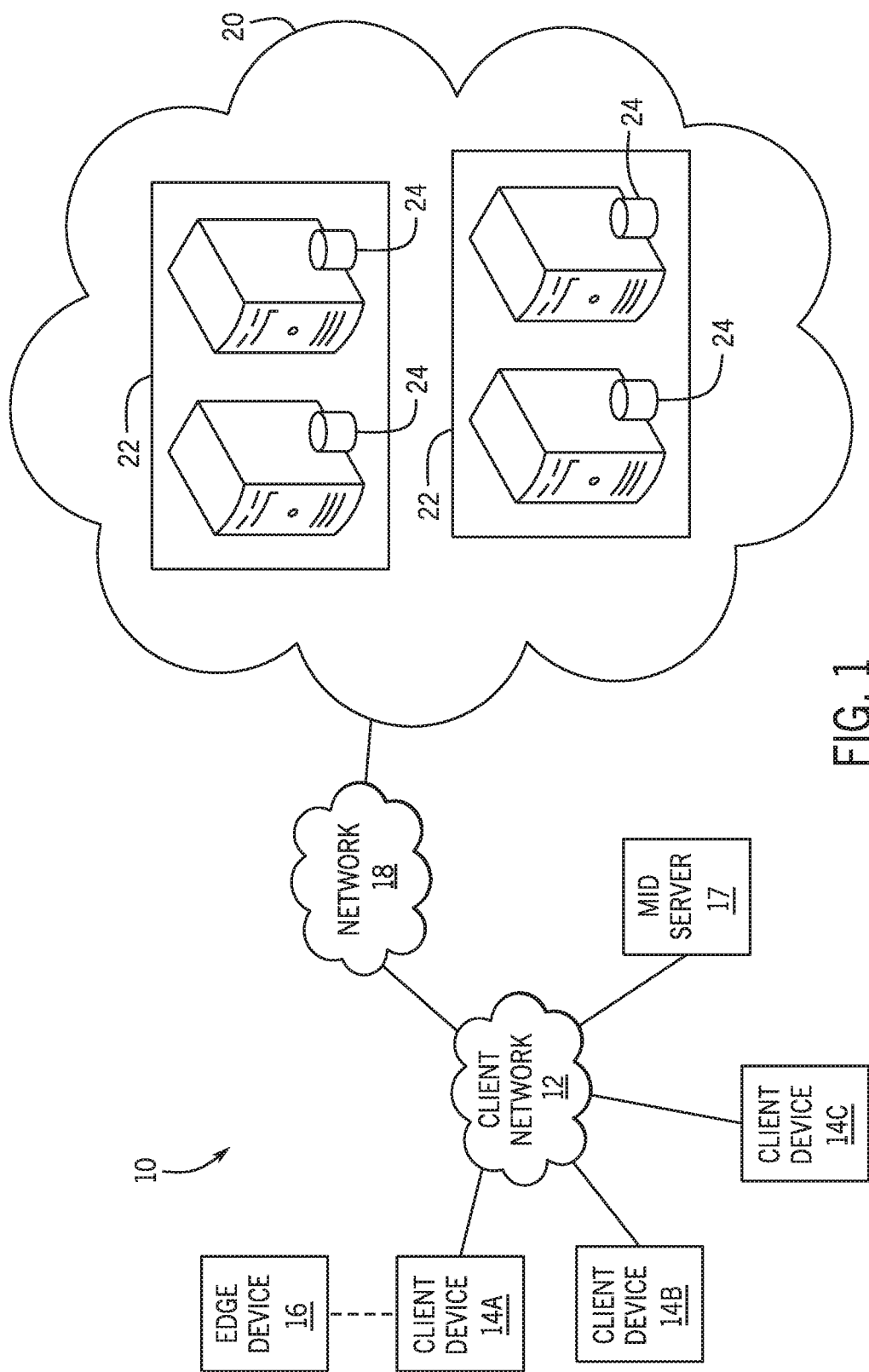
FIG. 1 is a block diagram of an embodiment of a cloud computing system in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to a single electronic computing device that includes, but is not limited to a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

Aspects of the present disclosure describe generation and use of a planning console having a project planning tool, such as a semi-automated project scheduling mode, which may be used to manage project tasks. For example, a planning console may be generated by a cloud computing system as part of a client instance accessed by a planner. The planning console comprises a semi-automated scheduling mode and allows review and updating of a project with a plurality of project tasks. The project tasks may include a predecessor task having a planned timing. The system determines at least one dependency relationship between the predecessor task and at least one successor task. Moreover, the system identifies a timing difference between the planned timing and an actual timing of the predecessor task once the predecessor task is indicated as completed. Further, the system generates one or more user-selectable interaction points, in the semi-automated scheduling mode, wherein interaction with a first interaction point causes the project to be automatically updated such that the timing of at least one successor task is based on or corresponds to the actual timing based at least on the dependency relationship and interaction with a second interaction point causes the project timeline to remain the same, i.e., unchanged.

With the preceding in mind, the following figures relate to various types of generalized system architectures or configurations that may be employed to provide services to an organization in a multi-instance framework on which the present approaches may be employed. Correspondingly, these system and platform examples may also relate to systems and platforms on which the techniques discussed herein may be implemented or otherwise utilized. Turning now to FIG. 1, a schematic diagram of an embodiment of a computing system 10, such as a cloud computing system, where embodiments of the present disclosure may operate, is illustrated. Computing system 10 may include a client network 12, network 18 (e.g., the Internet), and a cloud-based platform 20. In some implementations, the cloud-based platform may be a configuration management database (CMDB) platform. In one embodiment, the client network 12 may be a local private network, such as local area network (LAN) that includes a variety of network devices that include, but are not limited to, switches, servers, and routers. In another embodiment, the client network 12 represents an enterprise network that could include one or more LANs, virtual networks, data centers 22, and/or other remote networks. As shown in FIG. 1, the client network 12 is able to connect to one or more client devices 14A, 14B, and 14C so that the client devices are able to communicate with each other and/or with the network hosting the platform 20. The client devices 14A-C may be computing systems and/or other types of computing devices generally referred to as Internet of Things (IoT) devices that access cloud computing services, for example, via a web browser application or via an edge device 16 that may act as a gateway between the client devices and the platform 20. FIG. 1 also illustrates that the client network 12 includes bridge device server (e.g., a management, instrumentation, and discovery (MID) server 17) that facilitates communication of data between the network hosting the platform 20, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 18. The network 18 may include one or more computing networks, such as other LANs, wide area networks (WAN), the Internet, and/or other remote networks, in order to transfer data between the client devices 14A-C and the network hosting the platform 20. Each of the computing networks within network 18 may contain wired and/or wireless programmable devices that operate in the electrical and/or optical domain. For example, network 18 may include wireless networks, such as cellular networks (e.g., Global System for Mobile Communications (GSM) based cellular network), WiFi® networks (WIFI is a registered trademark owned by Wi-Fi Alliance Corporation), and/or other suitable radio-based networks. The network 18 may also employ any number of network communication protocols, such as Transmission Control Protocol (TCP) and Internet Protocol (IP). Although not explicitly shown in FIG. 1, network 18 may include a variety of network devices, such as servers, routers, network switches, and/or other network hardware devices configured to transport data over the network 18.

In FIG. 1, the network hosting the platform 20 may be a remote network (e.g., a cloud network) that is able to communicate with the client devices 14A-C via the client network 12 and network 18. The network hosting the platform 20 provides additional computing resources to the client devices 14A-C and/or client network 12. For example, by utilizing the network hosting the platform 20, users of client devices 14A-C are able to build and execute applications for various enterprise, IT, and/or other organization-related functions. In one embodiment, the network hosting the platform 20 is implemented on one or more data centers 22, where each data center could correspond to a different geographic location. Each of the data centers 22 includes a plurality of virtual servers 24 (also referred to herein as application nodes, application servers, virtual server instances, application instances, or application server instances), where each virtual server can be implemented on a physical computing system, such as a single electronic computing device (e.g., a single physical hardware server) or across multiple-computing devices (e.g., multiple physical hardware servers). Examples of virtual servers 24 include, but are not limited to a web server (e.g., a unitary Apache installation), an application server (e.g., unitary Java® Virtual Machine), and/or a database server, e.g., a unitary MySQL® catalog (MySQL® is a registered trademark owned by MySQL AB A COMPANY).

To utilize computing resources within the platform 20, network operators may choose to configure the data centers 22 using a variety of computing infrastructures. In one embodiment, one or more of the data centers 22 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server and/or other combinations of physical and/or virtual servers 24, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 20, and customer-driven upgrade schedules. An example of implementing a customer instance within a multi-instance cloud architecture will be discussed in more detail below with reference to FIG. 2.

Figure 2:
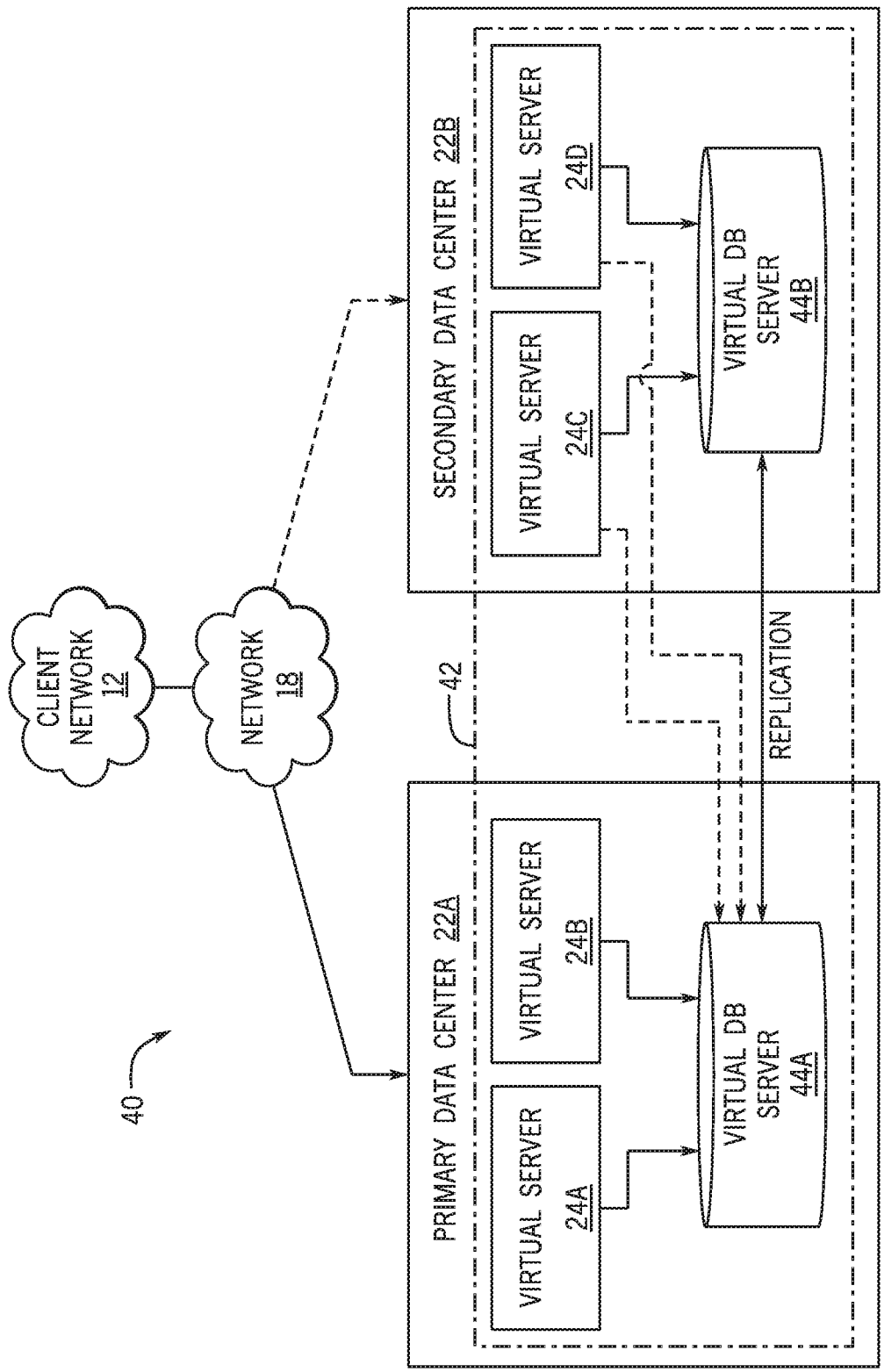
FIG. 2 is a block diagram of an embodiment of a multi-instance cloud architecture in which embodiments of the present disclosure may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two (e.g., paired) data centers 22A and 22B that may be geographically separated from one another. Using FIG. 2 as an example, network environment and service provider cloud infrastructure client instance 42 (also referred to herein as a simply client instance 42) is associated with (e.g., supported and enabled by) dedicated virtual servers (e.g., virtual servers 24A, 24B, 24C, and 24D) and dedicated database servers (e.g., virtual database servers 44A and 44B). Stated another way, the virtual servers 24A-24D and virtual database servers 44A and 44B are not shared with other client instances but are specific to the respective client instance 42. Other embodiments of the multi-instance cloud architecture 40 could include other types of dedicated virtual servers, such as a web server. For example, the client instance 42 could be associated with (e.g., supported and enabled by) the dedicated virtual servers 24A-24D, dedicated virtual database servers 44A and 44B, and additional dedicated virtual web servers (not shown in FIG. 2).

In the depicted example, to facilitate availability of the client instance 42, the virtual servers 24A-24D and virtual database servers 44A and 44B are allocated to two different data centers 22A and 22B, where one of the data centers 22 acts as a backup data center. In reference to FIG. 2, data center 22A acts as a primary data center 22A that includes a primary pair of virtual servers 24A and 24B and the primary virtual database server 44A associated with the client instance 42, and data center 22B acts as a secondary data center 22B to back up the primary data center 22A for the client instance 42. To back up the primary data center 22A for the client instance 42, the secondary data center 22 includes a secondary pair of virtual servers 24C and 24D and a secondary virtual database server 44B. The primary virtual database server 44A is able to replicate data to the secondary virtual database server 44B.

As shown in FIG. 2, the primary virtual database server 44A may replicate data to the secondary virtual database server 44B using, e.g., a Master-Master MySQL Binlog replication operation. The replication of data between data could be implemented by performing full backups weekly and daily incremental backups in both data centers 22A and 22B. Having both a primary data center 22A and secondary data center 22B allows data traffic that typically travels to the primary data center 22A for the client instance 42 to be diverted to the second data center 22B during a failure and/or maintenance scenario. Using FIG. 2 as an example, if the virtual servers 24A and 24B and/or primary virtual database server 44A fails and/or is under maintenance, data traffic for client instances 42 can be diverted to the secondary virtual servers 24C and the secondary virtual database server instance 44B for processing.

Although FIGS. 1 and 2 illustrate specific embodiments of a cloud computing system 10 and a multi-instance cloud architecture 40, respectively, the disclosure is not limited to the specific embodiments illustrated in FIGS. 1 and 2. For instance, although FIG. 1 illustrates that the platform 20 is implemented using data centers, other embodiments of the platform 20 are not limited to data centers and can utilize other types of remote network infrastructures. Moreover, other embodiments of the present disclosure may combine one or more different virtual server into a single virtual server. Using FIG. 2 as an example, the virtual servers 24A-D and virtual database servers 44A and 44B may be combined into a single virtual server. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
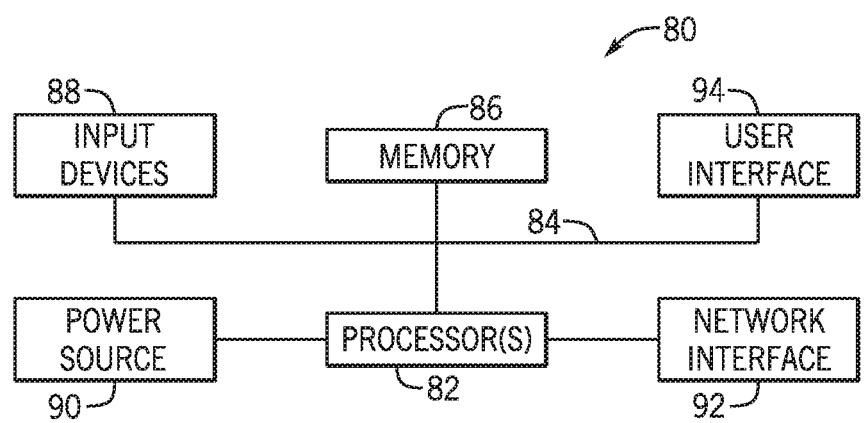
FIG. 3 is a block diagram of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 80 and their potential interconnections or communication paths, such as along one or more busses. As illustrated, the computing system 80 may include various hardware components such as, but not limited to, one or more processors 82, one or more busses 84, memory 86, input devices 88, a power source 90, a network interface 92, a user interface 94, and/or other computer components useful in performing the functions described herein.

The one or more processors 82 may include one or more microprocessors capable of performing instructions stored in the memory 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86.

With respect to other components, the one or more busses 84 includes suitable electrical channels to provide data and/or power between the various components of the computing system 80. The memory 86 may include any tangible, non-transitory, and computer-readable storage media. Although shown as a single block in FIG. 1, the memory 86 can be implemented using multiple physical units of the same or different types in one or more physical locations. The input devices 88 correspond to structures to input data and/or commands to the one or more processor 82. For example, the input devices 88 may include a mouse, touchpad, touchscreen, keyboard and the like. The power source 90 can be any suitable source for power of the various components of the computing device 80, such as line power and/or a battery source. The network interface 92 includes one or more transceivers capable of communicating with other devices over one or more networks (e.g., a communication channel). The network interface 92 may provide a wired network interface or a wireless network interface. A user interface 94 may include a display that is configured to display text or images transferred to it from the one or more processors 82. In addition and/or alternative to the display, the user interface 94 may include other devices for interfacing with a user, such as lights (e.g., LEDs), speakers, and the like.

Figure 4:
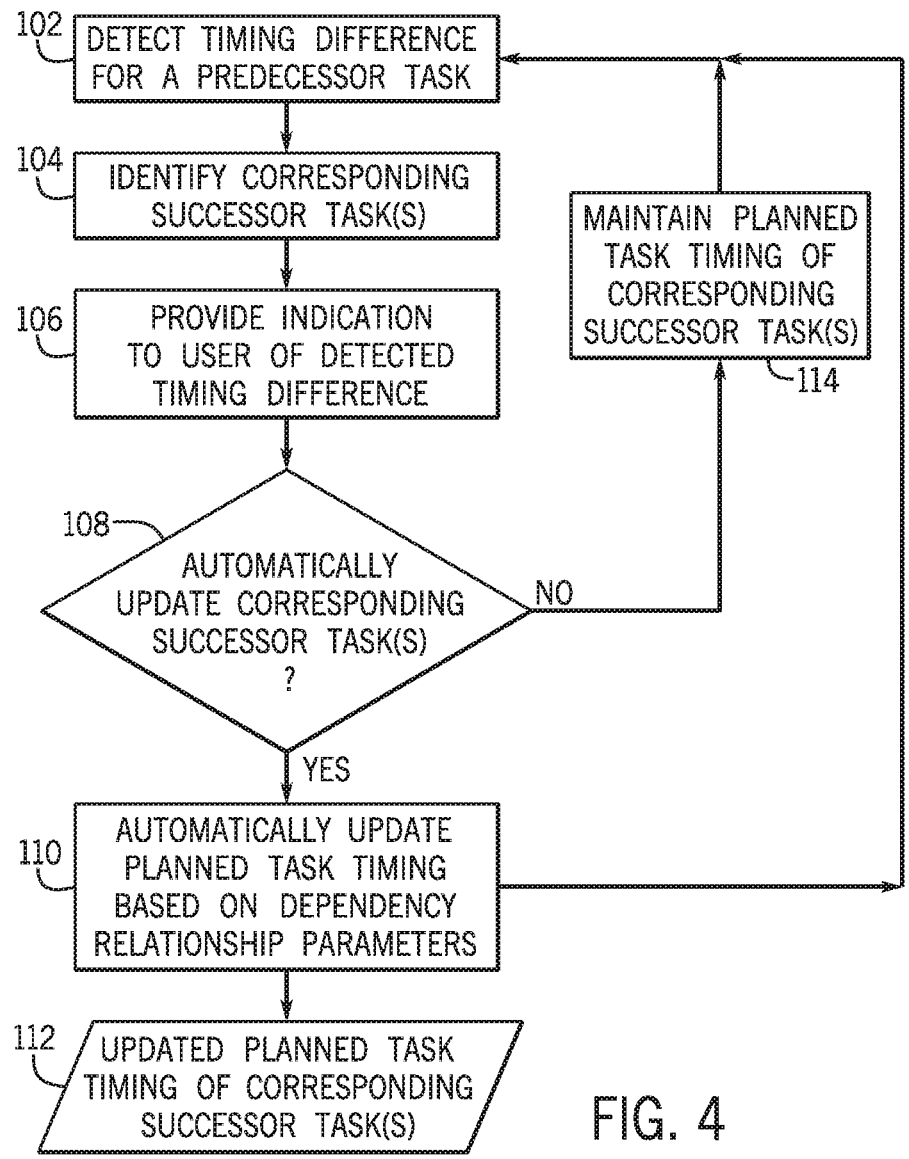
FIG. 4 is a flow diagram of a method to implement a planning based scheduling mode for a planning console, in accordance with aspects of the present disclosure.

Turning to FIG. 4, this figure depicts a flow diagram that shows a method to implement a semi-automated scheduling mode 100 for a planning console. In the semi-automated scheduling mode 100, the planning console may detect a timing difference for a predecessor task (block 102). The timing difference may occur when the user inputs actual task timing (e.g., actual start date, actual end date, or planned duration) for a predecessor task that differs from the planned timing for the predecessor task, in accordance with actual progression of the predecessor task. For example, a predecessor task has a planned end date 138 (FIG. 5) for March $20^{th}$, but the predecessor task is actually completed on March $18^{th}$, so the user enters the actual end date 144 (FIG. 5) accordingly. In this example, a timing difference occurs due to the actual end date 144 of the predecessor task being earlier than the planned end date 138 of the predecessor task.

In response to the timing difference, the planning console may identify corresponding successor tasks (block 104). The corresponding successor tasks include project tasks having a dependency relationship with the predecessor task having the timing difference. In some embodiments, the corresponding successor tasks only includes the successor tasks dependent on the project task parameter (e.g., planned start date or planned end date) of the predecessor task related to the timing difference. For example, a first successor task may have a finish-start type dependency relationship to a first predecessor task having a detected timing difference. Thus, a planned start date 136 of the first successor task is dependent on a planned end date 138 of the first predecessor task. In this example, the timing difference occurred due to an actual start date 142 occurring later than the planned start date 136, which does not automatically update the planned start date 136 or planned end date 138 of the first predecessor task, as discussed in detail below. Hence, the timing difference is only related to the start date of the first predecessor task. As such, the first successor task does not depend on the parameter of the first predecessor task related to the timing difference and would not be identified as a corresponding successor task for the timing difference. However, a second successor task having a start-start type dependency would be a corresponding successor task in this example. Therefore, although the predecessor task may have a plurality of successor tasks, not all successor tasks may be relevant or otherwise of interest for a particular timing difference.

The planning console may provide an indication to a user of the detected timing difference (block 106). The planning console may provide a single indication to the user relevant to the most relevant successor task in a sequence or hierarchy (e.g., the next task) or may provide a separate indication to the user for each corresponding successor task. In some embodiments, the planning console may provide a single indication to the user for all of the corresponding successor tasks. In other embodiments, the planning console may provide an indication to the user even when the planning console does not identify any corresponding successor tasks related to the timing difference. Embodiments of the indications are discussed in detail below in FIGS. 11-13.

The indication may provide the user with a selectable option to update the planned timing of the corresponding successor task(s) (block 108), via one or more user-selectable interaction points. For example, the indication itself may include a first interaction point configured to update the planned timing of the corresponding successor tasks and a second interaction point to cause the project to maintain planned timing of the corresponding successor tasks, as discussed in detail below in FIG. 13. Interacting with the first interaction point may automatically update the planned timing for the corresponding successor tasks based on dependency relationship parameters (block 110) such that the corresponding successor tasks have an updated planned timing (block 112). Whereas, interacting with the second interaction point to maintain planned timing (block 114) of the corresponding successor tasks causes the project to remain the same, i.e., the timeline for the successor task(s) remains unchanged.

In some embodiments, the indication provides the user with the one or more user-selectable interaction points, such as may be displayed on a graphical user interface of a hosted client instance, for updating the planned timing via a visual notification to the user of the detected timing difference, as discussed below in FIGS. 11 and 12. In response to the indication, the user may interact with the first interaction point to modify the planned timing of the predecessor task, which automatically updates the corresponding successor tasks. Alternatively, the user may interact with the second interaction point to choose to not update the planned timing of the predecessor task to maintain the planned timing of the corresponding successor tasks.

Figure 5:
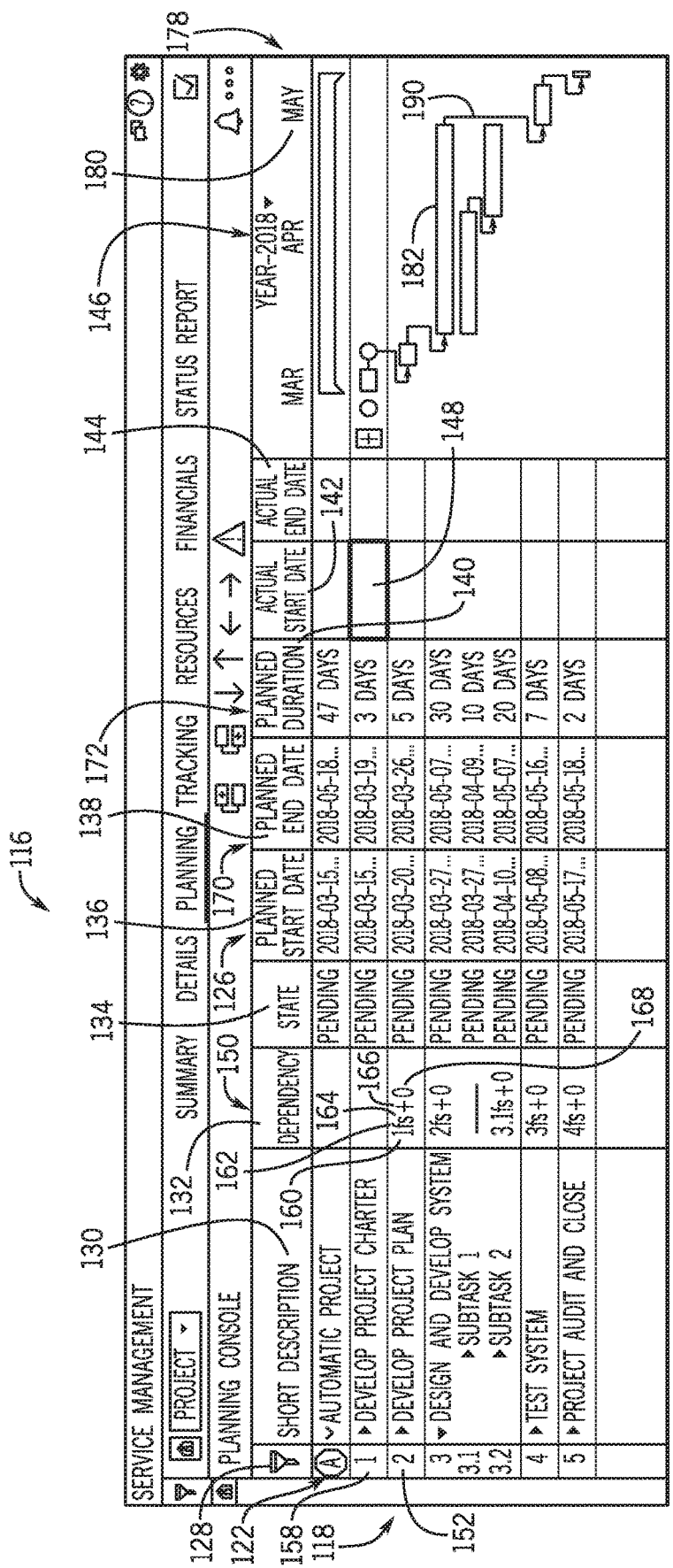
FIG. 5 is an example screenshot displaying a planning console having a plurality of tasks, in accordance with aspects of the present disclosure.

FIG. 5 is an example screenshot displaying a planning console 116 with a project having a plurality of project tasks 118. The planning console 116 includes a table 120 for managing the plurality of project tasks. Each project task of the plurality of project tasks has a row 122 in the table. The table 120 also includes a plurality of columns 124 to manage project task parameters 126. Project task parameters 126 may include a project task number 128, a short description 130, dependency relationships 132, a state 134, a planned start date 136, a planned end date 138, a planned duration 140, an actual start date 142, an actual end date 144, and assignees. The depicted example of a planning console 116 also includes a project graph 146 to provide a visual representation of project tasks and corresponding project task parameters 126.

The user may manually modify the project task parameter of a project task by selecting a cell 148 in the table 120 corresponding to the project task (i.e., row) and the project task parameter (e.g., column). In some embodiments, selecting the cell opens a pop-up menu having user-selectable interaction points appropriate for the corresponding project task parameter. Alternatively, the cell itself may constitute an interaction point such that interaction or editing of the cell constitutes interaction with an interaction point. In some embodiments, the planning console 116 locks a cell such that the user may not edit the project task parameter. For example, the planning console 116 may lock a cell representing the state of a project task to prevent a user from inadvertently changing the state of the project, which is inherently dependent on other project task parameters 126 (e.g., actual end date).

A dependency relationship column 150 of the plurality of columns may include a menu with one or more user-selectable options for the user to interact with to assign the dependency relationships. In other embodiments, the user may assign the dependency relationships by manually entering text into the cell of the dependency relationship column 150 corresponding to the project task to define the dependency relationship. In the present embodiment, a second project task 152, has a "1fs+0" dependency relationship. The first digit 160 "1" represents the project number for the predecessor task 154 of the dependency relationship. Thus, second project task 152 is a successor task 156 to a first project task 158. Moreover, the second digit 162 "f" represents the project task parameter of the predecessor task from which the successor task will depend. The third digit 164 represents the project task parameter of the successor task that depends of the predecessor task. In this embodiment "f" represents "planned end date" and "s" represents "planned start date." Thus, the dependency relationship is between the planned end date 138 of the predecessor task and the planned start date 136 of the successor task. Further, the fourth digit 166 and fifth digit 168 "+0" together represent the lag or lead, in a time unit (e.g., days), of the dependency relationship. Thus, there is no lag or lead in this embodiment and the planned start date 136 of the successor task will be the day after the planned end date 138 of the predecessor task. In another embodiment having the fourth and digits as "+1," the planned start date 136 of the successor task will be two days after the planned end date 138 of the predecessor task.

In some embodiments, a planned end date column 170 of the plurality of columns may be inherently dependent on a planned duration column 172 of the plurality of columns. For example, the first project task 158 may have a planned end date of March $19^{th}$ and a planned duration of 5 days. A user changes the planned duration 140 of the first project task 158 from 5 days to 6 days. The planning console 116 may only include weekdays (e.g., Monday through Friday), not weekends (e.g., Saturday and Sunday), in determining the planned end date 138 based on the planned duration 140. In response to the change in the planned duration 140, the planning console 116 may automatically update the planned end date to March $20^{th}$. Accordingly, changing the planned duration 140 of a predecessor task may create a timing difference 174.

The project graph 146 may include a plurality of bars 176 to represent each of the project tasks. An x-axis 178 of the project graph 146 my represent a time value 180. A planning bar 182 of the plurality of bars may represent the planned timing 184 of a project task. The planning bar may begin at the planned start date 136 and end at the planned end date 138. The planning bar 182 may have a color or texture to distinguish the planning bar 182 from other bars of the plurality of bars. In some embodiments, the project graph 146 includes an actual progress bar 186 to represent the actual timing 188 of the project task. The actual progress bar 186 may begin at the actual start date 142 and end at the actual end date 144. Further, the project graph 146 may include dependency lines 190. The dependency lines 190 provide a visual representation of the dependency relationships from the dependency relationship column.

Figure 6:
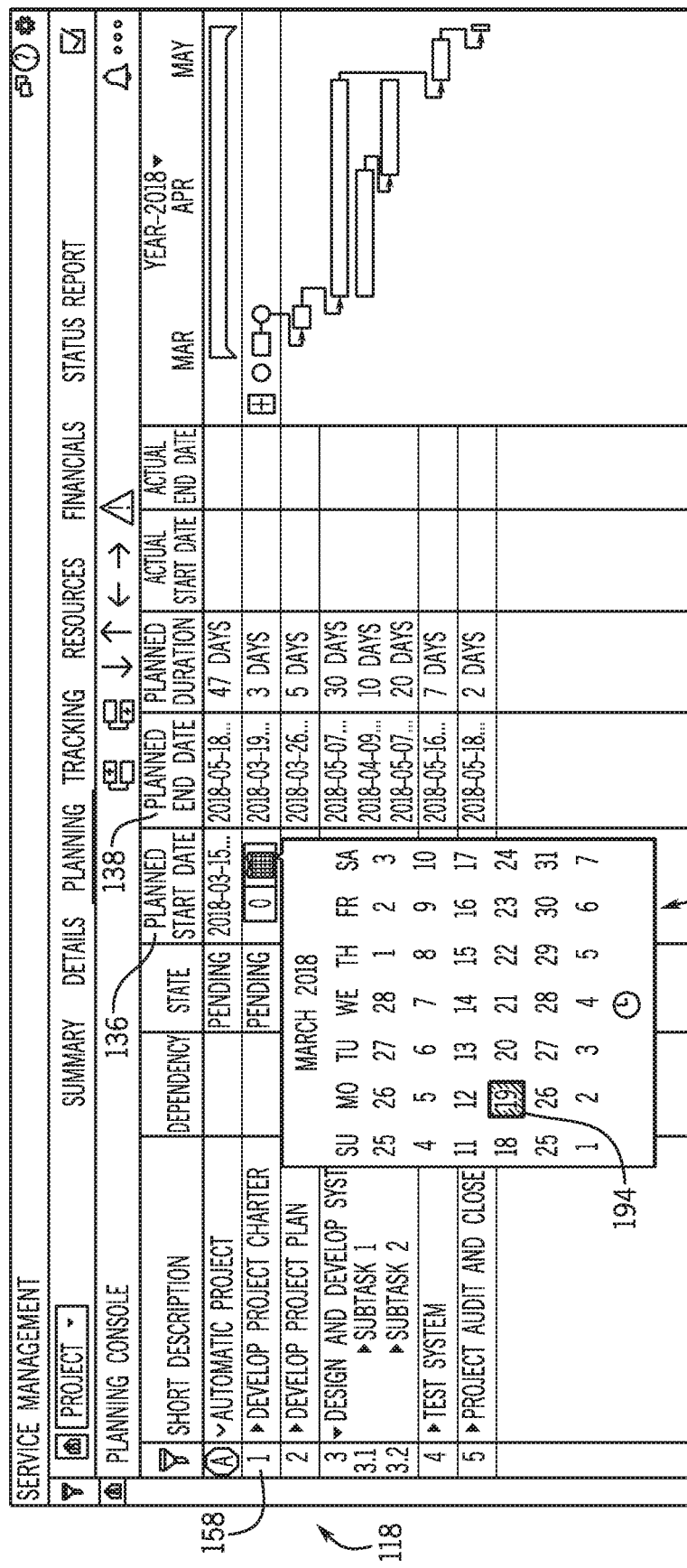
FIG. 6 is an example screenshot displaying a selectable calendar to change a planned start date for one of the plurality of tasks, in accordance with aspects of the present disclosure.

FIG. 6 is an example screenshot displaying a selectable calendar 192 having one or more user-selectable interaction points to change the planned start date 136 for one the plurality of tasks. The one or more user-selectable interaction points may correspond to planned start date options. In the present embodiment, the user may choose to automatically update the project via the selectable calendar 192, by interacting with the first interaction point (e.g., a user-selectable button 194 corresponding to a planned start date option on the selectable calendar), which is configured to change the planned start date 136 of the first project task 158. The selectable calendar 192 may be a pop-up calendar triggered by the user selecting the cell representing the planned start date 136 for one the plurality of project tasks 118. In the present embodiment, the pop-up calendar was triggered in response to the user selecting the cell representing the planned start date 136 for the first project task 158. Thus, the user may interact with the first interaction point of the one or more user-selectable interaction points on the selectable calendar to update the planned start date of the first project task.

As discussed above, in the semi-automated project scheduling mode, the planning console 116 may automatically update the planned start date 136 of the corresponding successor tasks in response to a change in the planned start date 138 of the predecessor task. As discussed above, the first interaction point may include the user-selectable button 194 corresponding to the planned start date option on the selectable calendar. Thus, the user may choose to automatically update the corresponding successor tasks by interacting with the first interaction point (e.g., the user-selectable button 194) to update planned start date of the predecessor task from the selectable calendar, which will automatically update the planned timing for corresponding successor tasks while the planning console is in the semi-automated project scheduling mode.

Figure 7:
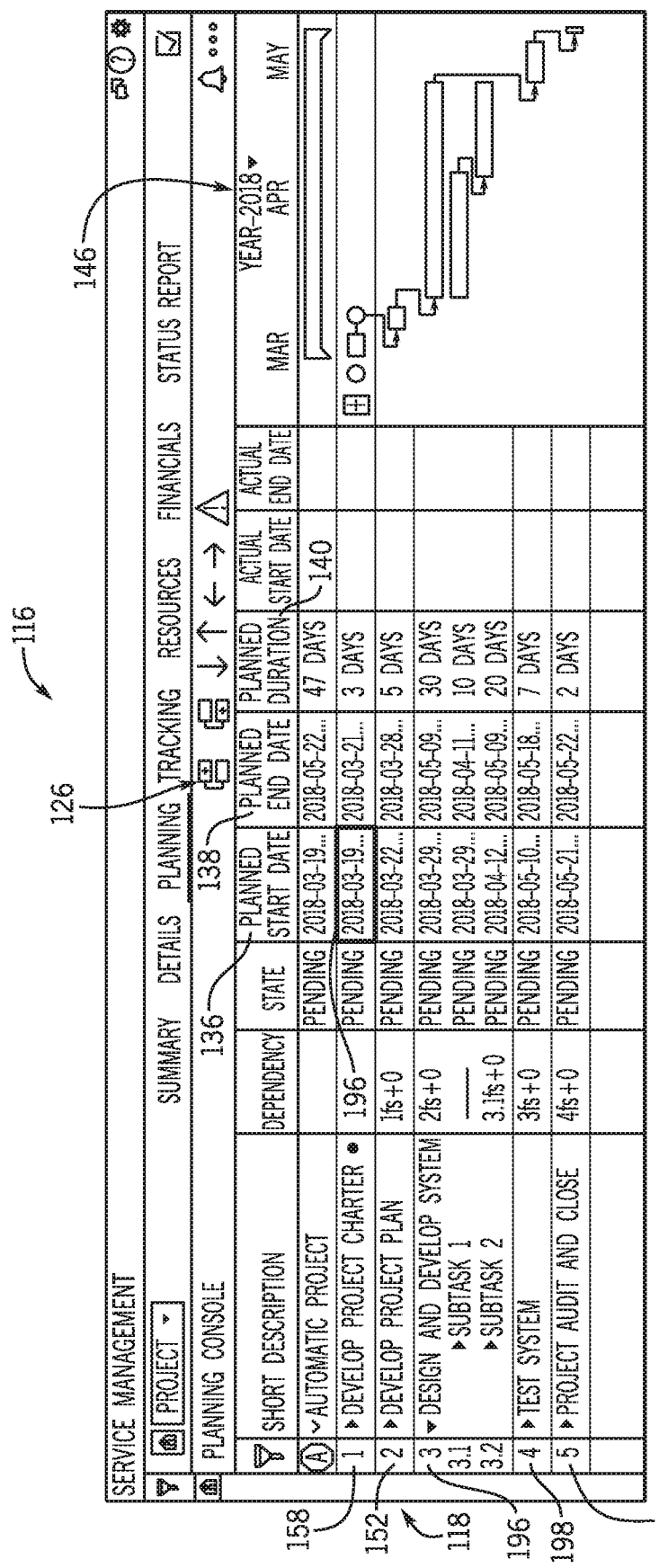
FIG. 7 is an example screenshot displaying an updated planned start date for one of the plurality of tasks, in accordance with aspects of the present disclosure.

FIG. 7 is an example screenshot displaying an updated planned start date 196 for one of the plurality of project tasks 118. In the present embodiment, the planned start date for the first project task 158 was updated in response to the user interacting with the first interaction point to update the planned start date. Specifically, the user updated the planned start date for the first project task 158 from March 15$^{th}$ to March 19$^{th}$. Additionally, updating the planned start date 136 of the first project task 158 automatically updated the planned end date 138 of the first project task 158. As discussed above, the planning console 116 may automatically update the planned end date 138 when a planned start date 136 of the project task is updated due to an inherent dependency on the planned duration 140 of the project task.

In the present embodiment, the second project task 152 also automatically updated. The second project task 152 (e.g., the corresponding successor task) has a finish-start type dependency relationship with the first project task 158 (e.g., the predecessor task). As such, the planned start date 136 of the second project task 152 automatically updated in response to the change in the planned end date 138 of the first project task 158. Similarly, the planned start dates of a third project task 196, fourth project task 198, and fifth project task 200 automatically updated based on their respective dependency relationships.

Updates to the project task parameters 126 may be reflected in the table 120 of the planning console 116. In some embodiments, the updates to the project task parameters 126 are additionally shown in the project graph 146 of the planning console 116.

Figure 8:
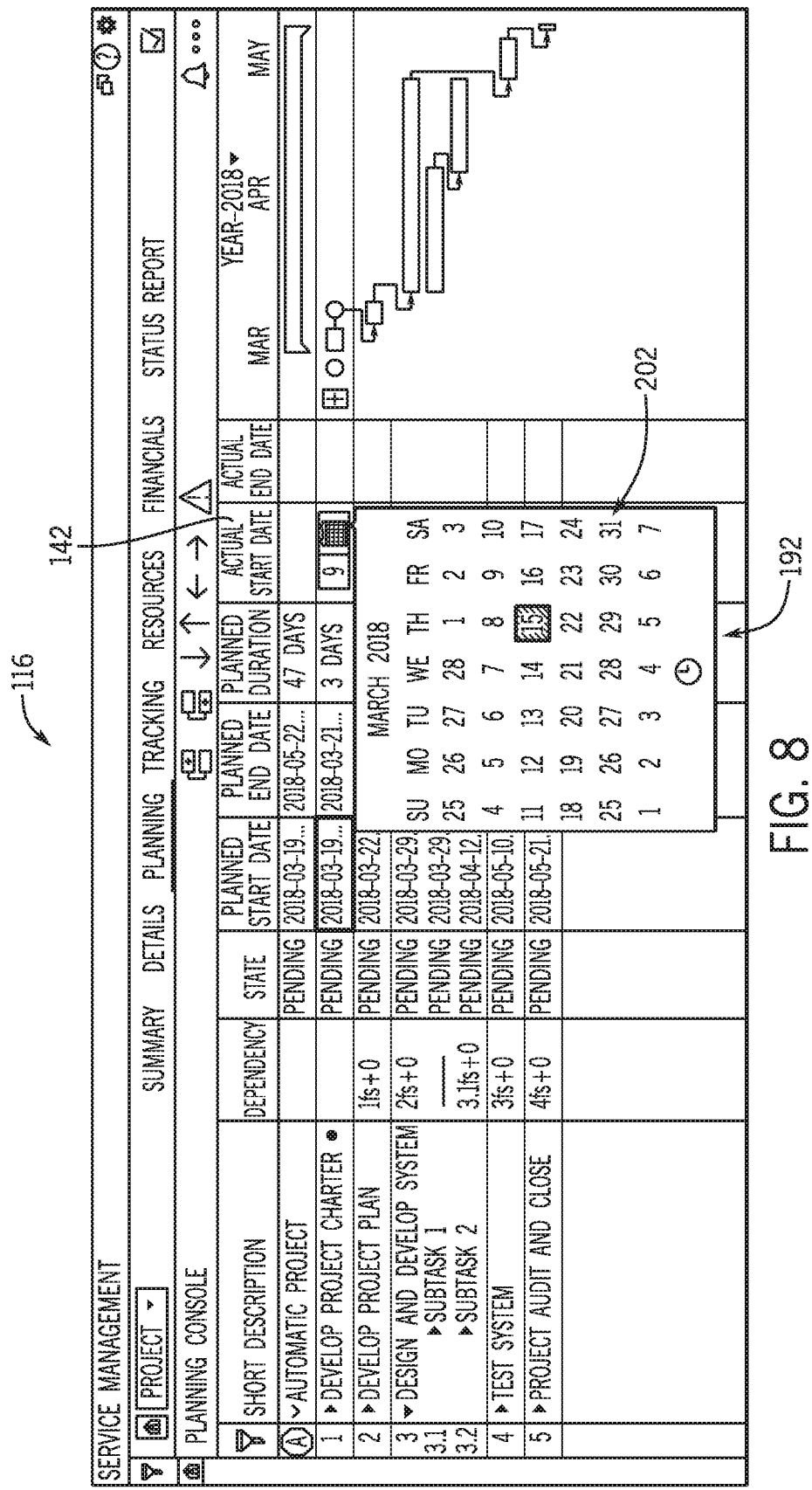
FIG. 8 is an example screenshot displaying a selectable calendar to change a actual start date for one of the plurality of tasks, in accordance with aspects of the present disclosure.

FIG. 8 is an example screenshot displaying the selectable calendar 192 having one or more user-selectable interaction points to change the actual start date 142 for one of the plurality of tasks. The selectable calendar 192 may be a pop-up calendar triggered by the user selecting the cell representing the actual start date 142 for the project task. In some embodiments, the selectable calendar 192 may not display future dates 202. Not displaying future dates 202 may provide a safe-guard for users to prevent the user from unintentionally inputting an incorrect actual start date 142 (i.e., an actual start date cannot be a future date).

In the present embodiment, the user interacting with an interaction point of the one or more interaction points to update the actual start date 142 of the predecessor task updates the actual start date of the predecessor task, but does not automatically update the planned timing of the predecessor task or any of the corresponding successor tasks. Although, updating the actual start date 142 may create a timing difference, the planning console 116 waits for user action (e.g., interacting with the one or more interaction points) before automatically updating project tasks. As discussed above, the user is provided with an option to automatically update corresponding successor tasks to a predecessor task in response to detection of the timing difference via one or more user-selectable interaction points. Specifically, the planning console 116 may automatically update the corresponding successor tasks in response to the user interaction with the first interaction point of the one or more user-selectable interaction points. In some embodiments, the user interacting with first interaction point automatically updates the planned timing of the predecessor task to match the actual timing of the predecessor task in response to detection of a timing difference.

Figure 9:
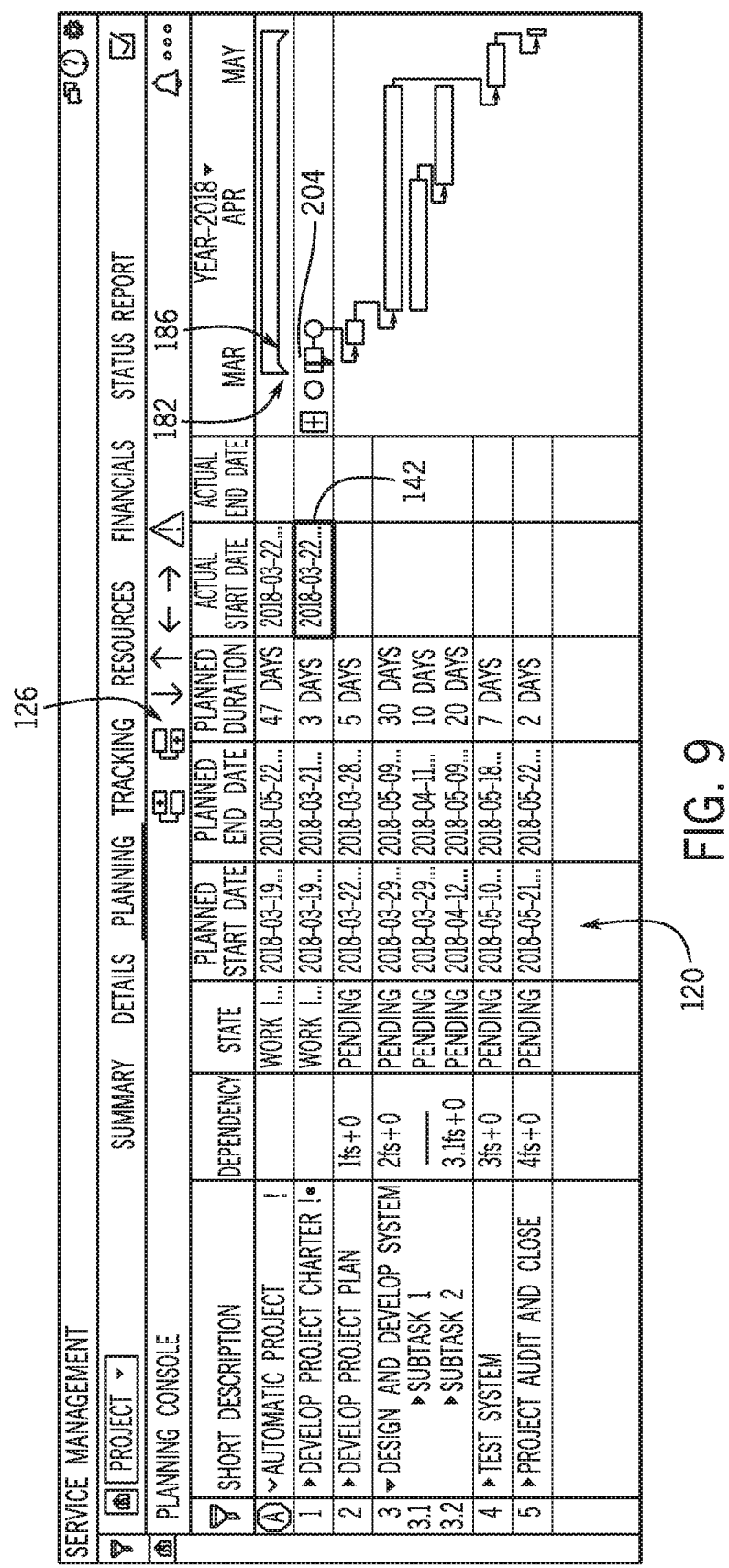
FIG. 9 is an example screenshot displaying an actual start date for the one of the plurality of tasks, in accordance with aspects of the present disclosure.

FIG. 9 is an example screenshot displaying the actual start date 142 for the one of the plurality of tasks. As discussed above, updating the actual start date 142 does not automatically update the planned timing of successor tasks. Thus, in the present embodiment, the table 120 includes the actual start date 142 selected by the user, but no other project task parameters 126 were updated based on the entering of the actual start date 142. In some embodiments, the actual start date 142 of the project may update in response to the user interacting with an interaction point of the one or more interaction points corresponding to the actual start date of the first project task 158.

In some embodiments, updating the actual start date 142 creates or modifies an actual progress bar start point 204 for the actual progress bar 186 on the graph of the planning console 116 for tracking the actual progress of a project task. The actual progress bar 186 may have a different color or texture than the planning bar 182 to allow a user to distinguish between the planning bar 182 and the actual progress bar 186. In some embodiments, one of the planning bar 182 and the actual progress bar 186 is set in the background and one is positioned in the foreground on the graph. In some embodiments, at least one of the planning bar 182 and the actual progress bar 186 includes an opacity such that both bars are visible to the user.

Figure 10:
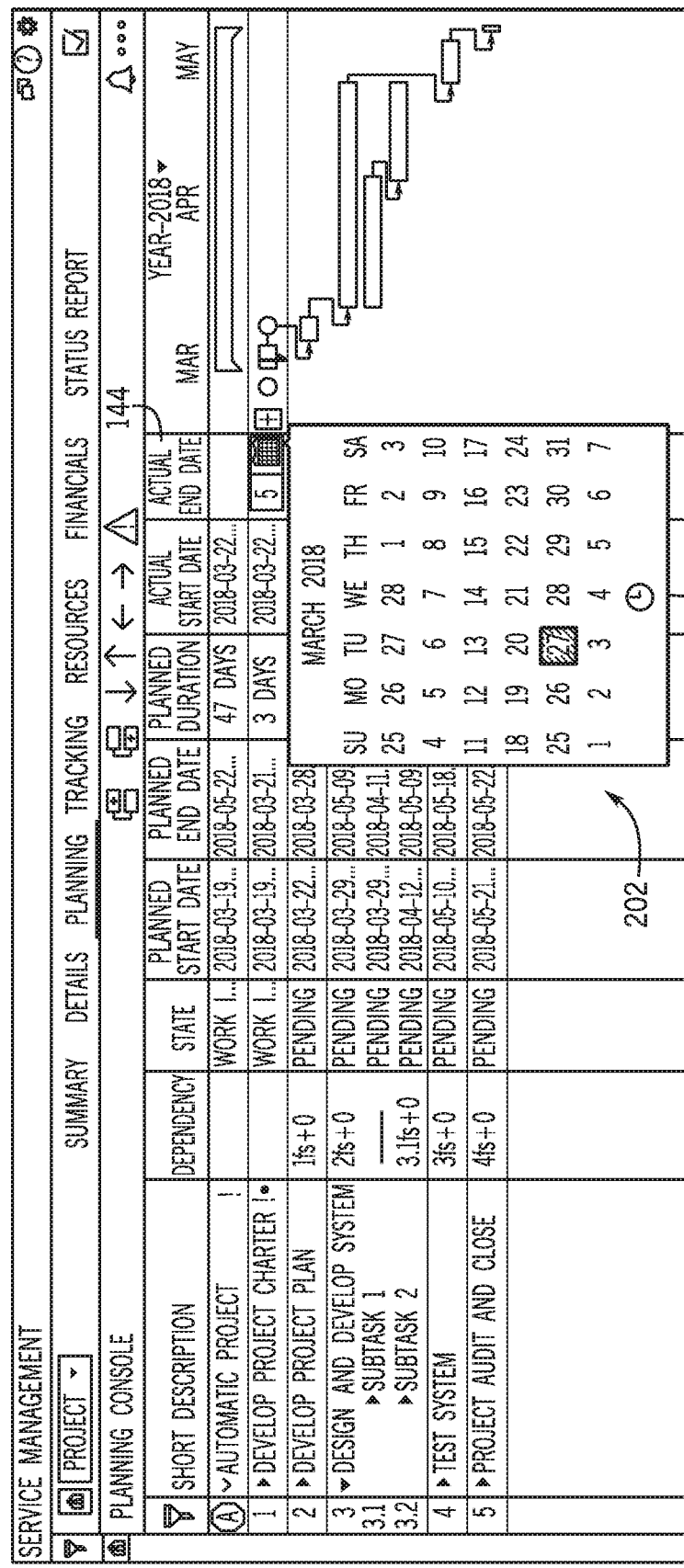
FIG. 10 is an example screenshot displaying a selectable calendar to change a actual end date for one of the plurality of tasks, in accordance with aspects of the present disclosure.

FIG. 10 is an example screenshot displaying a selectable calendar 192 having one or more user-selectable interaction points to change the actual end date 144 for one of the plurality of tasks. The user may enter the actual end date 144 to represent when the project task is completed. The user may enter the actual end date 144 via the selectable calendar. The selectable calendar 192 may be a pop-up calendar triggered by the user selecting a cell representing an actual end date 144 for a project task. In some embodiments, the selectable calendar 192 may only display current and past dates to prevent the user from unintentionally inputting future dates 202.

Figure 11:
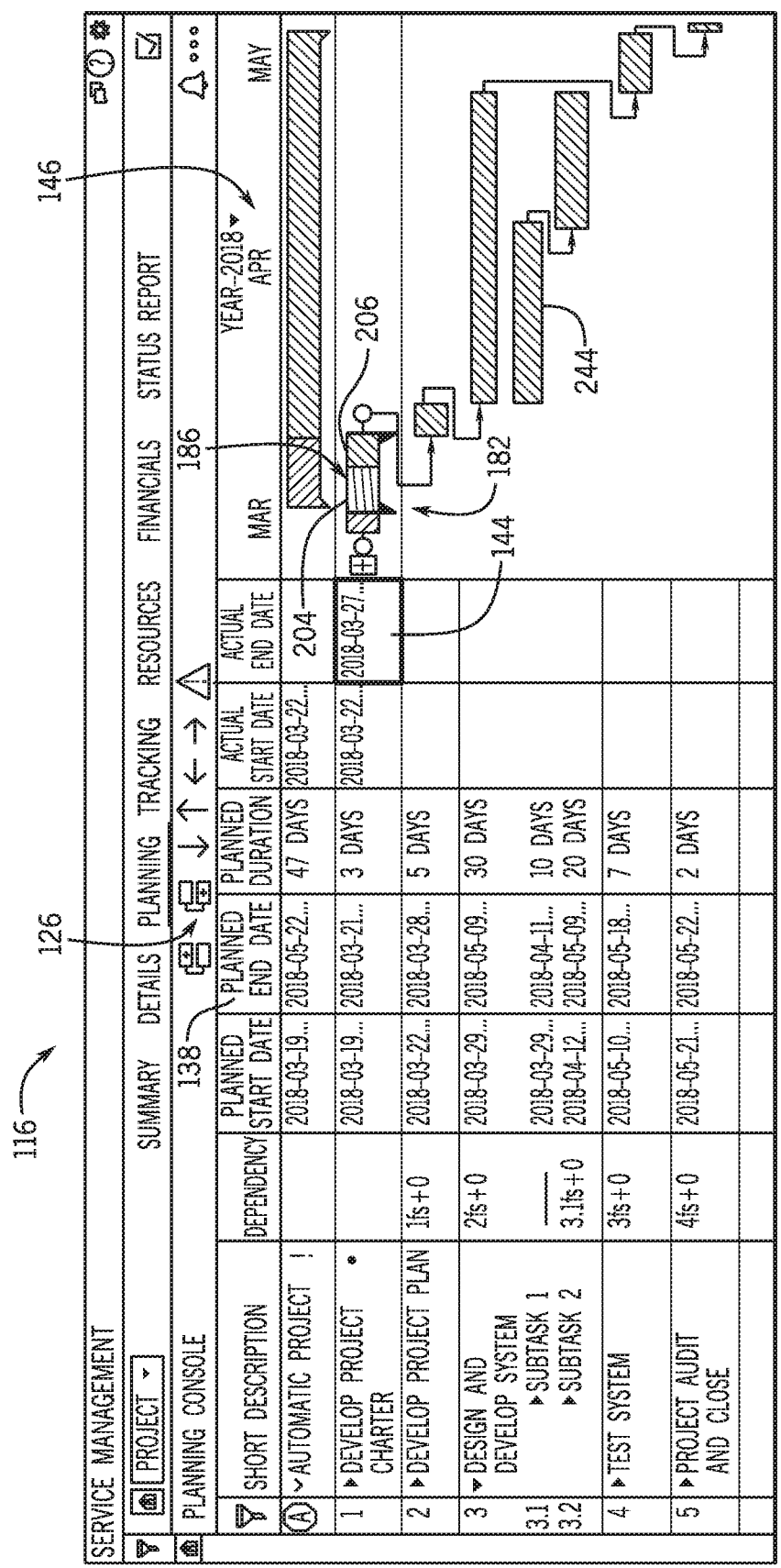
FIG. 11 is an example screenshot displaying an actual end date for the one of the plurality of tasks, in accordance with aspects of the present disclosure.

FIG. 11 is an example screenshot displaying the actual end date 144 for the one of the plurality of tasks. In the semi-automated project scheduling mode, updating the actual end date 144 does not automatically update the planned timing of successor tasks. Thus, in the present embodiment, the table includes the actual end date 144 selected by the user, but no other project task parameters 126 were updated based on the entering of the actual end date 144.

In some embodiments, selecting an actual end date 144 creates or modifies an actual progress bar end point 206 on the project graph 146 of the planning console 116 to track the actual progress of a project task. The actual progress bar 186 may extend from the actual progress bar start point 204 to the actual progress bar end point 206. In some embodiments, the actual progress bar 186 may be converted to a completed bar in response to entering the actual progress bar end point 206. The completed bar may have a different color or texture than both the planning bar 182 and the actual progress bar. In some embodiment, the user may generate actual progress points to indicate progress of the project task by interacting with the one or more interaction points corresponding to actual progress point options. The actual progress bar 186 may extend from the actual progress bar start point 204 to the most recent actual progress point. In some embodiments, the actual progress points are generated based on the completion of subtasks to the project task. The actual task progress point may indicate and actual end date 144 or planned end date 138 of a subtask 244 to the project task.

As discussed above, updating the actual end date 144 does not automatically update the predecessor task or any of the corresponding successor tasks. However, entering the actual end date 144 may create a timing difference, and in response, the planning console 116 may provide an indication 210 to the user of the timing difference. In some embodiments, the indication may be a change in color or shape of the bar representing one of the plurality of project tasks 118 on the project graph 146. In other embodiments, the indication may be a passive indication. For example, the planning bar 182 and the actual progress bar 186 having different colors may provide the passive indication to the user that a timing difference has occurred.

In response to the indication 210 of the timing difference, the planning console 116 may provide the user with an option to automatically update the planned timing of the corresponding successor tasks or to maintain the project plan by keeping the planned timing for the corresponding successor tasks despite the timing difference. In the present embodiment, the user may choose to automatically update the successor tasks by interaction with the first interaction point (e.g., a user-selectable button representing a planned end date on the selectable calendar) to change the planned end date 138 of the predecessor task having the timing difference. As discussed above, changing the planned end date 138 of a predecessor task automatically updates the corresponding successor tasks.

Figure 12:
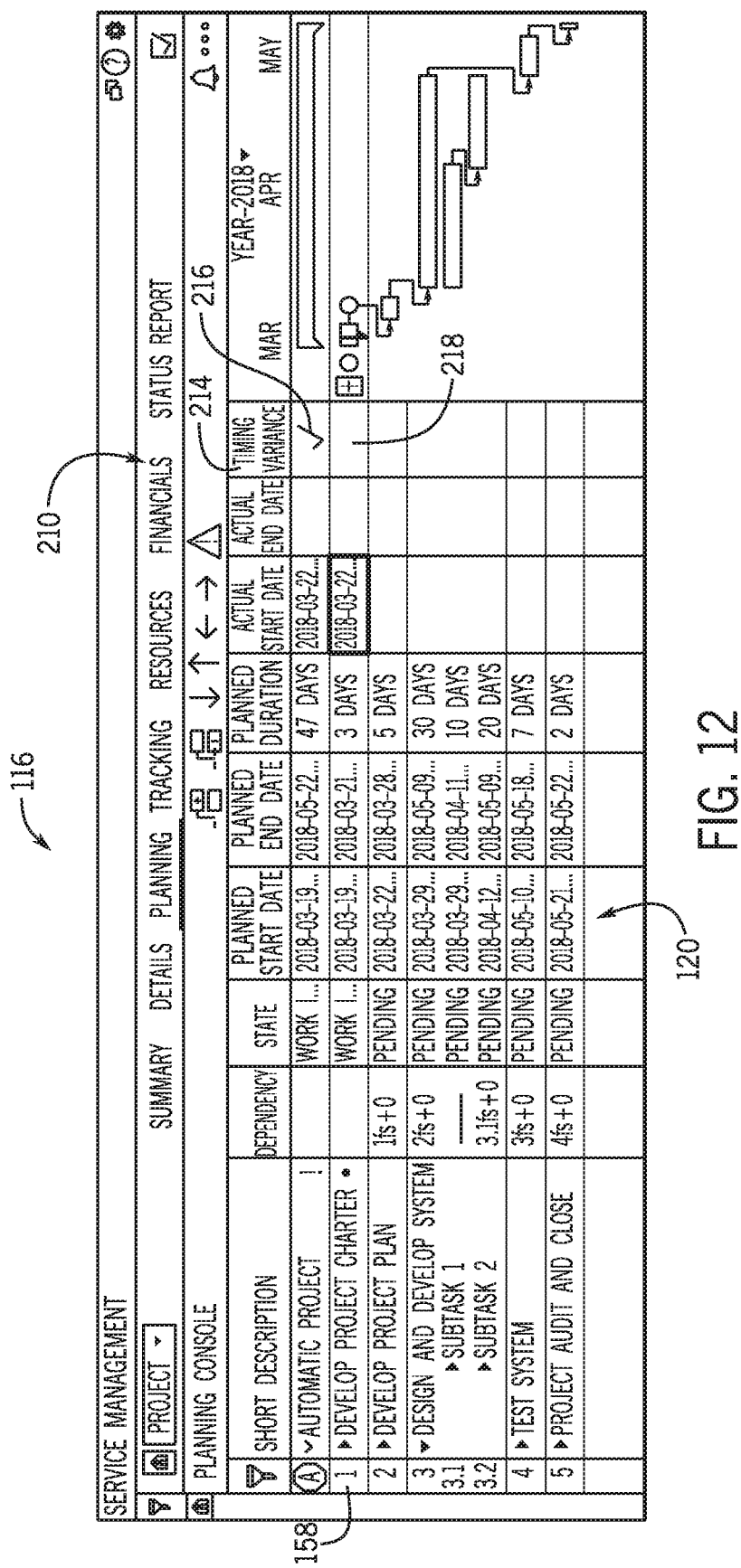
FIG. 12 is an example screenshot displaying a timing difference column of the planning console, in accordance with aspects of the present disclosure.

FIG. 12 is an example screenshot displaying the timing difference for the first project task 158 in a column of the planning console 116. In some embodiments, the planning console 116 may provide the indication 210 via a timing difference detected column 214 in the table 120 of the planning console. The timing difference detected column may provide a visual indication for the user to quickly inspect the project for timing differences.

In some embodiments, the planning console 116 may automatically update the cell in the timing difference detected column in response to detecting the timing difference. For example, upon a determination that the timing difference has occurred, the planning console 116 may automatically place a mark 216 in a cell of the timing difference detected column corresponding to the project task having the timing difference. The mark 216 may be a symbol (e.g., a check mark). In other embodiments, the mark 216 includes a written description (e.g., "Yes"). However, in another embodiment, the absence of the mark 216 may indicate that a timing difference has not occurred. For example, a blank cell 218 in the timing difference detected column may indicate that a timing difference is not present for the project task corresponding to the blank cell 218. In some embodiments, a negative mark (e.g., "X," "No," etc.) in a cell of the timing difference detected column indicates that a timing difference has not occurred.

Further, via the indication 210, the planning console 116 may alert the user of the option to automatically update the corresponding successor tasks. The user may update the corresponding successor tasks by updating the planned timing of the predecessor task having the timing difference, via interacting with the first interaction point. As discussed above, updating the planned timing of a predecessor task may automatically update the corresponding successor tasks. Alternatively, the user may interact with the second interaction point to maintain the project. In some embodiments, the user may interact with the second interaction point by interacting with any interaction point of the one or more interaction points that do not update the planned timing of the predecessor task). In other embodiments, the user may take no action, which causes the planning console to maintain the project.

Figure 13:
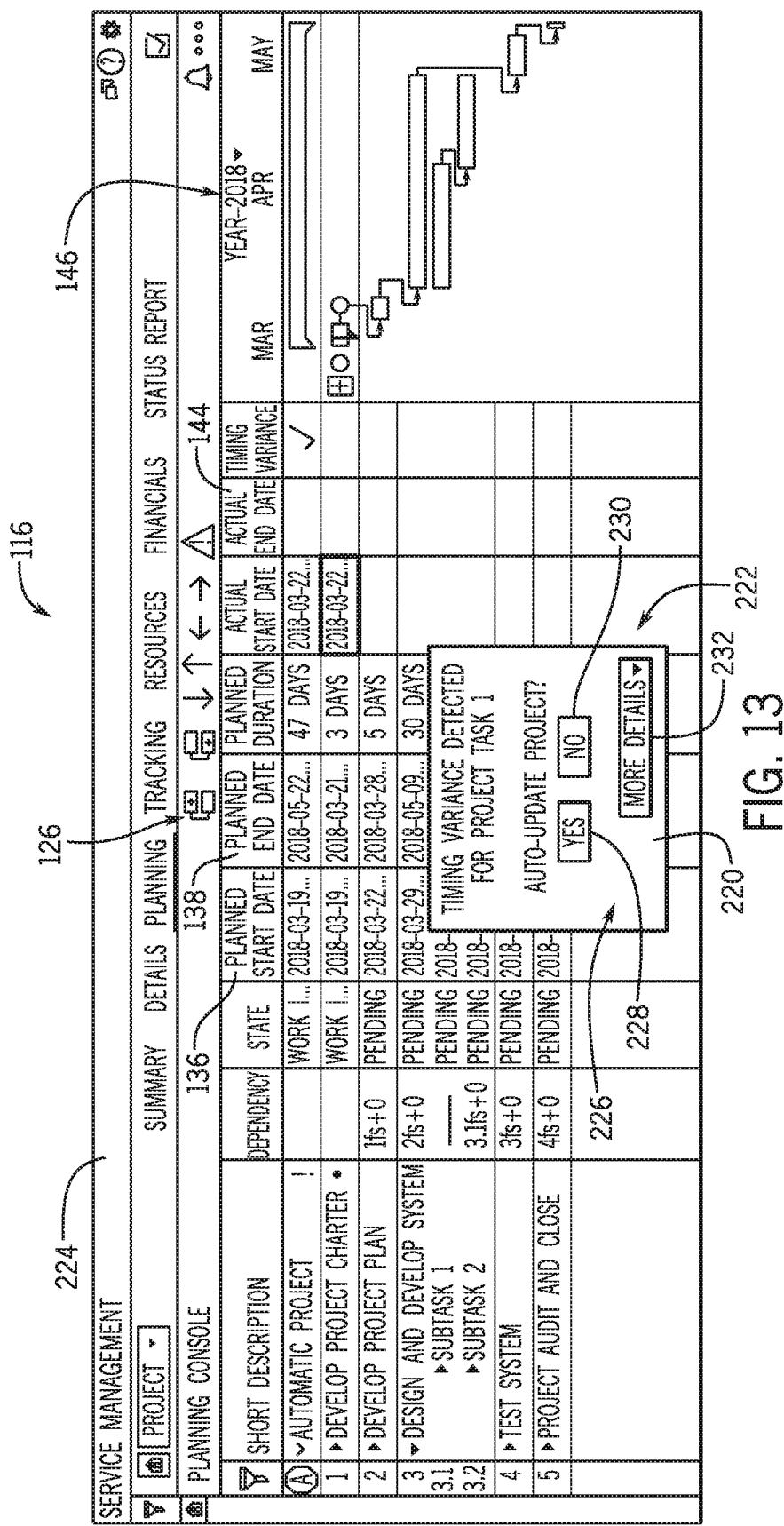
FIG. 13 is an example screenshot displaying a prompt indicating a timing difference for one of the plurality of tasks, in accordance with aspects of the present disclosure.

FIG. 13 is an example screenshot displaying a prompt 220 indicating a timing difference for one of the plurality of tasks. In some embodiments, the planning console 116 may provide an active indication 222 of a timing difference. The active indication 222 may include a prompt 220 displayed on an interface 224 of the planning console. The prompt 220 may be a pop-up window that appears in response to a user interaction that creates a timing difference (e.g., the user updating an actual end date of a project task to a date that is later than the planned end date for the project task).

In the present embodiment, the prompt 220 further provides the user with the one or more interaction points 226. The one or more interaction points 226 include a first interaction point 228 to automatically update the planned timing of the corresponding successor tasks. Additionally, the one or more interaction points 226 include a second interaction point 230 to maintain the project plan. The first interaction point 228 may automatically update the planned timing of the corresponding successor tasks by changing the planned end date 138 for the predecessor task having the timing difference, such that the corresponding successor tasks automatically update based at least in part on the update to the planned end date 138 of the predecessor task. In another embodiment, selecting the first interaction point 228 automatically updates the planned timing of the corresponding successor tasks by changing the planned start date 136 for each of the corresponding successor tasks to the actual end date 144 of the predecessor task selected by the user, via the first interaction point.

In some embodiments, the second interaction point 230 configured to maintain the project plan may keep the planned timing of the predecessor task and the corresponding successor tasks. Further, the second interaction point 230 may signal to the planning console 116 that the timing difference is an acceptable timing difference. The planning console 116 may not provide the active indication 222 for the acceptable timing difference. However, changing one of the project task parameters 126 related to the acceptable timing difference may convert the acceptable timing difference to a timing difference, such that the planning console 116 re-provides the active indication 222 of the timing difference.

In some embodiments, the planning console 116 disables the table 120 and/or project graph 146 until the user responds to the active indication 222, via interaction with the one or more interaction points. In other embodiments, the user may interact with the second interaction point by minimizing or exiting the active indication 222. The planning console 116 may re-provide the active indication 222 in response to the user exiting the active indication 222 after a pre-determined period of time.

In some embodiments, the active indication 222 (e.g., the prompt) may include a third interaction point 232 for requesting additional details. The third interaction point 232 may expand a size of the active indication 222 (e.g., expand the size of the prompt window) and provide additional details pertaining to the particular time difference(s) that triggered the active indication 222 in the space created by expanding the size of the active indication window. The additional details may include the name of the project task having the timing difference and the planned timing and actual timing that triggered the timing difference. For example, the additional details may include the project task name (e.g., project task 1), the planned start date 136 (e.g., March 15$^{th}$), and the actual start date (e.g., March 19$^{th}$). The additional details may aid the user in selecting between the first interaction point 228 and the second interaction point 230.

Figure 14:
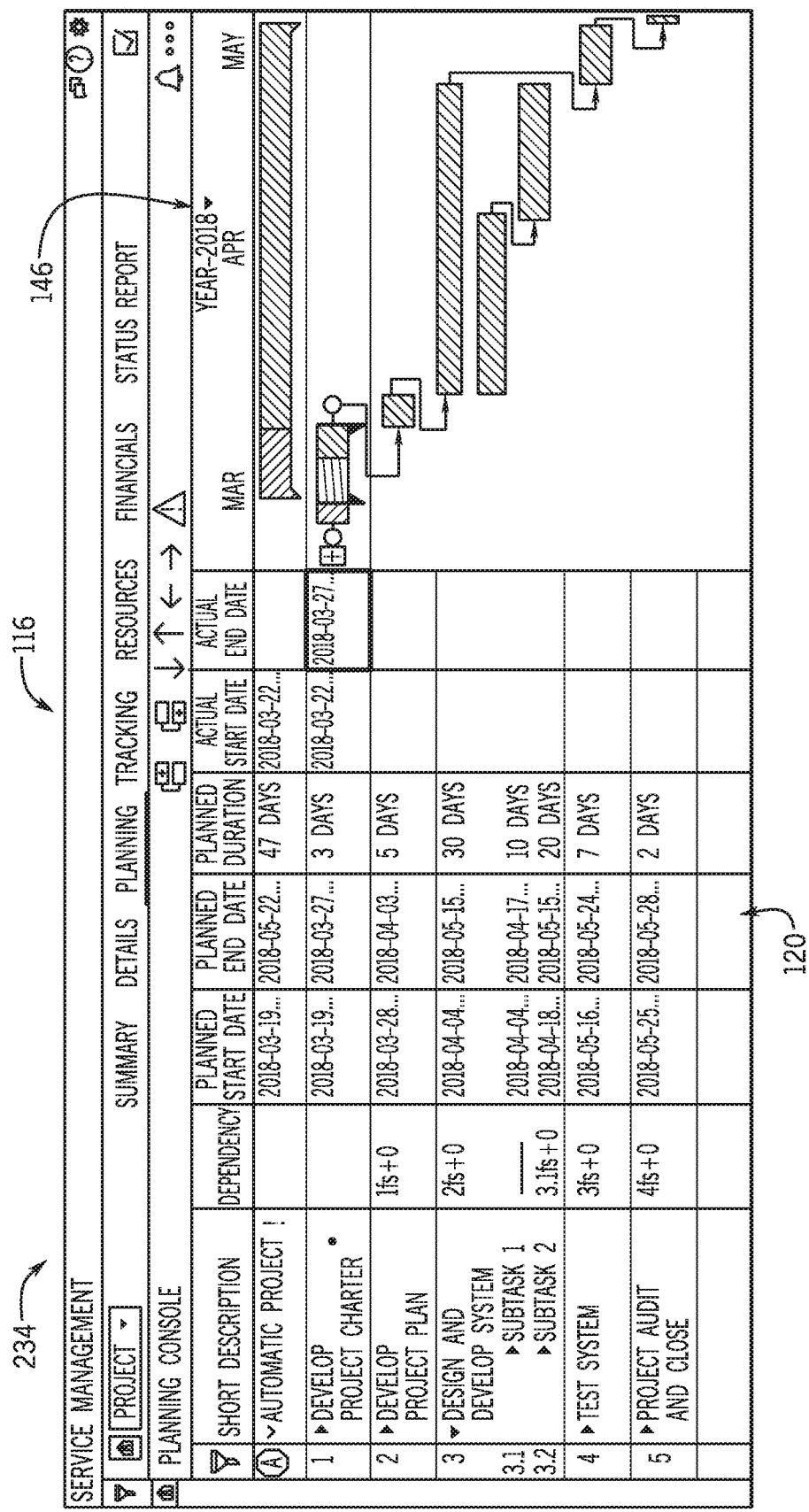
FIG. 14 is an example screenshot displaying an updated project, in accordance with aspects of the present disclosure.

FIG. 14 is an example screenshot of an updated project 234. In the present embodiment, the user interacted with the first interaction point to automatically update the planned timing of the corresponding successor tasks. Accordingly, the planning console 116 updated the corresponding successor tasks of the predecessor task having the timing difference. The table 120 of the planning console and the project graph 146 show the updated corresponding successor tasks.

Figure 15:
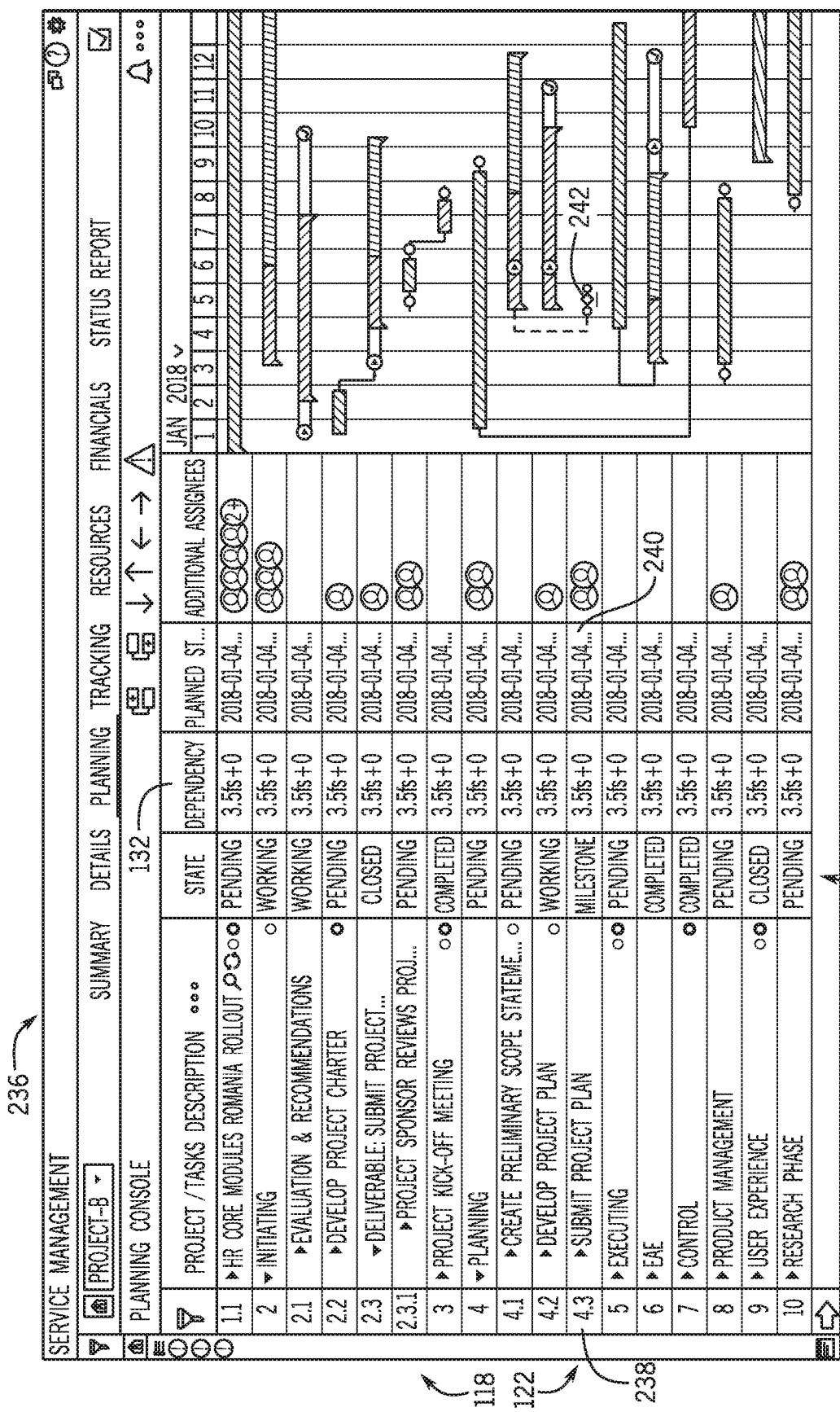
FIG. 15 is an example screenshot displaying a second project plan having a project milestone, in accordance with aspects of the present disclosure.

FIG. 15 is an example screenshot displaying a second project 236 having a plurality of project tasks 118 and a project milestone 238. In some embodiments, the project milestone 238 is an event that occurs in response to the actual start date or the actual end date of at least one of the plurality of project tasks 118, another project milestone 238, or some combination thereof. Additionally, the project milestone 238 may include a dependency relationship 132. In some embodiments, the dependency relationship 132 relates to planned timing on of the plurality of project tasks. The project milestone 238 may act similarly to predecessor tasks or successor tasks for purposes of the dependency relationship. For example, the project milestone 238 may have a finish-start type dependency relationship to a predecessor task. In this example, the project milestone 238 includes a milestone start date 240 (e.g., the date that the project event takes place) on the actual/planned end date of the project task.

In some embodiments, the project milestone 238 is entered in a row 122 of the table 120 among the project tasks. The project milestone 238 may have the same date for both the planned start date and the planned end date of the project milestone 238. Accordingly, planning console may inherently create an interdependency between the planned start date and the planned end date of the project milestone 238, and further between the actual start date and actual end date of a project milestone. The project milestone 238 may be represented by a symbol 242 in the project graph 146. In the present embodiment, the project milestone 238 is represented by a diamond-shaped symbol.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system comprising:
a datacenter separate from a client network, wherein the datacenter comprises one or more processors communicatively coupled to a corresponding memory device, wherein the one or more processors are configured to host a client instance that is accessible on the client network, wherein the system is configured to perform operations comprising:
generating a graphical user interface (GUI) accessible to the client instance, wherein the GUI comprises a table and a project graph;
determining a dependency for a project displayed on the GUI, wherein the dependency is indicative of a timing relationship between a predecessor task having a planned timing and a successor task;
identifying a timing difference between the planned timing and an actual timing of the predecessor task, wherein the timing difference comprises a deviation between at least one of:
an actual start time and a planned start time of the predecessor task;
an actual end time and a planned end time of the predecessor task; or
a planned duration and an actual duration of the predecessor task;
in response to identifying the timing difference, generating two or more user-selectable interaction points on the GUI; and
in response to receiving an input indicative of an interaction with a first interaction point of the two or more user-selectable interaction points, automatically updating at least one of a planned start time of the successor task, a planned end time of the successor task, or a planned duration of the successor task on the table and the project graph based on the actual timing of the predecessor task; and
in response to receiving an input indicative of an interaction with a second interaction point of the two or more user-selectable interaction points, overriding an update to at least one of the planned start time of the successor task, the planned end time of the successor task, or the planned duration of the successor task such that the planned start time of the successor task, the planned end time of the successor task, and the planned duration of the successor task remain unchanged on the table and the project graph.

2. The system of claim 1, wherein the table stores:
a plurality of project tasks, corresponding project task details; and
corresponding project task parameters.

3. The system of claim 2, wherein the corresponding project task parameters comprise one or more of the dependency, a planned start date, a planned end date, the planned duration of the predecessor task, an actual start date, and an actual end date.

4. The system of claim 2, wherein the table comprises at least one selectable cell to allow modification, via the GUI, of at least one of the plurality of project tasks, the corresponding project task parameters, or some combination thereof.

5. The system of claim 2, wherein the table comprises a column or a row configured to provide an indication in the table of the timing difference between the planned timing and the actual timing of the predecessor task.

6. The system of claim 1, wherein the project graph is configured to provide a visual representation of a plurality of project tasks and corresponding project task parameters.

7. The system of claim 1, wherein the project graph comprises a planning bar and an actual progress bar for each project task of a plurality of project tasks, and wherein the planning bar is configured to provide a visual representation of the planned timing, and the actual progress bar is configured to provide a visual representation of the actual timing, respectively.

8. The system of claim 1, wherein the planned timing comprises one or more of a planned predecessor start date of the predecessor task, a planned predecessor end date of the predecessor task, a planned successor start date of the successor task, and a planned successor end date of the successor task, and wherein the actual timing comprises one or more of an actual predecessor start date of the predecessor task, an actual predecessor end date of the predecessor task, the planned successor start date of the successor task, and the planned successor end date of the successor task.

9. The system of claim 1, wherein the timing difference is based on a difference between a planned predecessor start date and an actual predecessor start date or between a planned predecessor end date and an actual predecessor end date.

10. The system of claim 1, wherein the GUI comprises a project milestone comprising a milestone dependency relationship associated with a respective project task of a plurality of project tasks.

11. The system of claim 1, wherein the GUI comprises a subtask option to create a subtask comprising a dependency between the subtask and a respective project task, and wherein the subtask is the predecessor task in the dependency.

12. A computer-implemented method for managing a project, the computer-implemented method comprising:

generating, via a processor of a datacenter separate from a client network and configured to host a client instance, a graphical user interface (GUI) accessible from the client instance, wherein the GUI comprises a table and a project graph; and for a project with a plurality of project tasks comprising a predecessor task with a planned timing:

determining, via the processor, a dependency indicative of a timing relationship between the predecessor task and at least one successor task of the project;

identifying, via the processor, a timing difference between the planned timing and an actual timing of the predecessor task, wherein the timing difference comprises a deviation between at least one of:

an actual start time and a planned start time of the predecessor task;

an actual end time and a planned end time of the predecessor task; or a planned duration and an actual duration of the predecessor task; and in response to identifying the timing difference, generating, via the processor, two or more user-selectable interaction points on the GUI;

wherein interaction with a first interaction point of the two or more user-selectable interaction points automatically updates at least one of a planned start time of the at least one successor task, a planned end time of the at least one successor task, or a planned duration of the at least one successor task on the table and the project graph based on the actual timing of the predecessor task; and wherein interaction with a second interaction point of the two or more user-selectable interaction points overrides an update to at least one of the planned start time of the at least one successor task, the planned end time of the at least one successor task, or the planned duration of the at least one successor task such that the planned start time of the at least one successor task, the planned end time of the at least one successor task, and the planned duration of the at least one successor task remain unchanged on the table and the project graph.

13. The computer-implemented method of claim 12, wherein the dependency comprises a finish-start type dependency, a start-finish type dependency, a start-start type dependency, or a finish-finish type dependency between the predecessor task and the successor task, or a combination thereof.

14. The computer-implemented method of claim 12, wherein the GUI is configured to maintain a planned predecessor timing and a planned successor timing in response to a change in the actual timing of the predecessor task.

15. A tangible, non-transitory, computer-readable medium storing instructions executable by a processor of a computing system, and wherein the instructions cause the processor to perform operations comprising:

generating a graphical user interface (GUI) accessible on a client network in communication with the computing system, wherein the GUI comprises a table and a project graph;

determining a dependency indicative of a timing relationship between a predecessor task having a planned timing and at least one successor task, wherein the predecessor task and the at least one successor task are part of a project;

determining a timing difference between the planned timing and an actual timing of the predecessor task, wherein the timing difference comprises a deviation between at least one of:

an actual start time and a planned start time of the predecessor task;

an actual end time and a planned end time of the predecessor task; or a planned duration and an actual duration of the predecessor task; and in response to determining the timing difference, generating (i) an indication of the timing difference and (ii) two or more user-selectable interaction points;

wherein interaction with a first interaction point of the two or more user-selectable interaction points automatically updates at least one of a planned start time of the at least one successor task, a planned end time of the at least one successor task, or a planned duration of the at least one successor task on the table and the project graph based on the indication of the timing difference, the actual timing of the predecessor task, or both; and wherein interaction with a second interaction point of the two or more user-selectable interaction points overrides an update to at least one of the planned start time of the at least one successor task, the planned end time of the at least one successor task, or the planned duration of the at least one successor task such that the planned start time of the at least one successor task, the planned end time of the at least one successor task, and the planned duration of the at least one successor task remain unchanged on the table and the project graph.

16. The tangible, non-transitory, computer-readable medium of claim 15, wherein the indication of the timing difference comprises a prompt, and wherein the prompt comprises the first interaction point as a selectable feature.

17. The tangible, non-transitory, computer-readable medium of claim 15, wherein a user interacts with the second interaction point by exiting the indication of the timing difference, selecting a selectable feature associated with the second interaction point, or interacting with a feature resulting in the project remaining unchanged, or any combination thereof.

18. The tangible, non-transitory, computer-readable medium of claim 15, wherein the first interaction point is interacted with by selecting a selectable button associated with the first interaction point or selecting a user-selectable interaction point related to the planned timing of the predecessor task.

* * * * *